UNITED STATES PATENT OFFICE.

MALCOLM F. EWEN AND GEORGE H. TOMLINSON, OF CHICAGO, ILLINOIS, ASSIGNORS TO STANDARD ALCOHOL COMPANY, OF NEW YORK, N. Y., A CORPORATION OF MAINE.

FUEL AND THE PROCESS OF PRODUCING FUEL FROM LIGNOCELLULOSE.

1,032,391.  Specification of Letters Patent.  Patented July 16, 1912.

No Drawing.  Application filed November 12, 1910.  Serial No. 592,062.

*To all whom it may concern:*

Be it known that we, MALCOLM F. EWEN, a citizen of the United States, and GEORGE H. TOMLINSON, a subject of the King of England, residing at Chicago, in the county of Cook and State of Illinois, have invented a certain new and useful Improvement in Fuel and the Process of Producing Fuel from Lignocellulose, of which the following is a specification.

Our invention relates to fuel produced from ligno-cellulose as a new article of manufacture and the process of producing the same in connection with the production of fermentable sugar from such ligno-cellulose.

The treatment of such ligno-cellulose for the extraction of sugar therefrom consists generally of first putting the ligno-cellulose in a digester with a limited amount of water and acid and under a proper degree of heat and pressure and then subjecting the product to some kind of a diffusion process for the extraction of the sugar formed by the first part of the process. These operations quite commonly leave the residue of the ligno-cellulose in such state or condition that it is unfit for fuel, being charged with a quantity of water and of such nature that the practical extraction of that water is impossible. Moreover, in such operations the comminuted ligno-cellulose not infrequently become of a nature unfitting it for fuel. If, however, the digesting process be carried on in such a way as to cause the formation of the sugar while at the same time changing the texture of the comminuted ligno-cellulose so as to make it hard or granular or so as to form its own filtering bed, the subsequent diffusion process will not alter the character of the material and therefore it will be left so that water can be extracted from it preferably by pressure. Heretofore, in the effort to use the materials derived from such digesters, they have sometimes been pressed into briquets or otherwise specially prepared, but the material has come from the digester or diffusion battery in such condition that it could not be used in a loose state or have the water practically taken from it so as to be fit for fuel in its loose condition.

A suitable hydrolyzing bath for the purpose of this invention may be prepared by thoroughly mixing with sawdust or other cellulosic raw material such proportion of a hydrolyzing acid, for example sulfuric acid, as will result in an acid concentration in the sawdust of 0.2 to 0.5 per cent. The acidified mixture, which should contain less moisture than is required for its saturation and should be therefore in a permeable and absorptive condition, is then digested in presence of steam under suitable pressure, say 60 to 90 pounds, until the fermentable sugars are formed. The matter is one of the highest importance in the operation of such plants, because the production of fermentable sugar or alcohol from ligno-cellulose involves the handling of vast quantities of such ligno-cellulose because of the relatively small quantity of sugar yielding constituents therein contained, and the use of enormous quantities of steam and power for the various operations required. To operate the process or carry out the same in such a way as to produce, with a minimum amount of difficulty, a maximum amount of good fuel from the residue, will doubtless result in great economies, and such economies are essential to successful operation.

The nature of the material as it comes from the digester may be made clear by contrasting it with the condition of the sawdust, which is a convenient form of comminuted ligno-cellulose, as it went into the digester. The sawdust is soft, tends to absorb moisture in a filtering funnel, tends to hold the water back, and, when saturated, tends to cling together in a mass. The material as it comes from the digester when treated as above suggested, is, in its response to water, more like sand than sawdust. Its particles are hardened and it does not tend to hold or retain any considerable amount of water. This, in the first place, permits a stream of water to be run or forced through the digester product in the diffusion battery, so that the sugar can be easily extracted, but it also permits the easy extraction of the remaining water from the digester material so that it becomes fit for fuel. If the material comes from the digester in a mucky, muddy mass, or in any condition which does not admit of the free passage of water and the easy extraction of such water in a drying process, then the material will be practically unfit for fuel. The material so prepared in the digester, according to our process, is put into the ordinary form of diffusion battery and a large quantity of water sent therethrough, with the result that the sugar is dissolved out of the digester product and carried into a tank for subsequent treatment. The residue is discharged from the diffusion battery, and, preferably, conveyed in such manner as to permit the major part of the water to drain away. The residue still actively charged with water is now squeezed in any desired manner, as, for example, in a cylindrical press; whereupon it is found that the water is so fully extracted, even by large presses, where large quantities of the material are treated, that it is quite fit for fuel. The condition of this material when it leaves the digester is such that it forms a kind of filtering bed, or self-filtering mass, through which the water freely flows, and it is this character of the material derived from the digester and the diffusion battery which makes it commercially practicable to extract the water so that the material can be used for fuel. It will be understood that one thing which makes this process of such great commercial importance is the fact that it is, commercially, extremely undesirable, if not impossible, to store and deal with quantities of comminuted ligno-cellulose, like sawdust, after the treatment of the same has been begun. It is desirable and almost commercially necessary that such ligno-cellulose or sawdust should be kept steadily in motion from the time it enters the digester until it is placed within reach of the furnace, for otherwise vast storage areas or bins have to be provided and the materials under consideration, when once they come to rest in masses of any considerable size, are extremely difficult to again start in motion. They tend to pack and remain fixed in position.

We claim:—

1. As a new article of manufacture suitable for use as a fuel, a product derived from comminuted ligno-cellulose by the action of a hydrolyzing agent under heat and pressure, with subsequent extraction of its soluble constituents, said product consisting of relatively hard, granular, and non-absorptive particles of insoluble cellulosic material, freed from excess water.

2. The process of producing a fuel from comminuted ligno-cellulose, which consists in subjecting the same, under heat and pressure, to the action of a hydrolyzing agent until the particles have become relatively hard, granular and non-absorptive and until those constituents capable of yielding fermentable sugars by hydrolysis under the conditions of the process have been converted into such sugars, then extracting the sugars, and freeing the residue from excess water.

MALCOLM F. EWEN.
GEORGE H. TOMLINSON.

Witnesses:
ERNEST S. BALL,
A. O. WENTE.

Copies of this patent may be obtained for five cents each, by addressing the "Commissioner of Patents, Washington, D. C."